United States Patent
Chang et al.

(10) Patent No.: US 8,721,086 B2
(45) Date of Patent: May 13, 2014

(54) PROJECTION APPARATUS HAVING LIGHT BEAM ADJUSTING ELEMENT

(75) Inventors: Jui-Ping Chang, Hsinchu (TW);
Hui-Ping Chen, Hsinchu (TW);
Hsin-Tai Wu, Hsinchu (TW);
Cheng-Wei Tien, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 121 days.

(21) Appl. No.: 13/185,514

(22) Filed: Jul. 19, 2011

(65) Prior Publication Data
US 2012/0113395 A1 May 10, 2012

(30) Foreign Application Priority Data

Nov. 5, 2010 (TW) .............................. 99138164 A (51) Int. Cl.
*G03B 21/00* (2006.01)
(52) U.S. Cl.
USPC ......................................................... 353/31
(58) Field of Classification Search
USPC ......................................................... 353/31
See application file for complete search history.

(56) References Cited

U.S. PATENT DOCUMENTS

2003/0107711 A1* 6/2003 Wang ............................... 353/31
2004/0252281 A1* 12/2004 Fischer et al. ................... 353/53
2006/0066540 A1* 3/2006 Hewlett et al. ................... 345/84
2007/0070307 A1* 3/2007 Cheng et al. ................... 353/102
2007/0206390 A1* 9/2007 Brukilacchio et al. ........ 362/555
2009/0190043 A1* 7/2009 Pei et al. ....................... 348/744

FOREIGN PATENT DOCUMENTS

| JP | 2005173019 | 6/2005 |
|---|---|---|
| TW | I230804 | 4/2005 |
| TW | M314352 | 6/2007 |
| TW | I292509 | 1/2008 |
| TW | I325091 | 5/2010 |

OTHER PUBLICATIONS

"Office Action of Taiwan Counterpart Application", issued on Jun. 21, 2013, p. 1-p. 8, in which the listed references were cited.

* cited by examiner

*Primary Examiner* — Thanh Luu
*Assistant Examiner* — Danell L Owens
(74) *Attorney, Agent, or Firm* — Jianq Chyun IP Office (57) ABSTRACT

A projection apparatus includes an illumination system, a light valve, a light beam adjusting element, and a light reflective unit. The illumination system is capable of providing an illumination beam. The light valve, the light beam adjusting element, and the light reflective unit are disposed on a transmission path of the illumination beam. The light valve is disposed between the illumination system and the light reflective unit. The light valve has an active surface for being capable of converting the illumination beam into an image beam. The light beam adjusting element is disposed on the transmission path of the illumination beam and between the illumination system and the light valve. The light beam adjusting element includes at least one lens having a first optical axis. The first optical axis and a normal vector of the active surface are not perpendicular to each other.

19 Claims, 12 Drawing Sheets

PROJECTION APPARATUS HAVING LIGHT BEAM ADJUSTING ELEMENT

CROSS-REFERENCE TO RELATED APPLICATION

This application claims the priority benefit of Taiwan application serial no. 99138164, filed on Nov. 5, 2010. The entirety of the above-mentioned patent application is hereby incorporated by reference herein and made a part of this specification.

BACKGROUND OF THE INVENTION

1. Field of the Invention

The invention generally relates to a projection apparatus, and more particularly, to a projection apparatus able to reduce stray light.

2. Description of Related Art

When a projection apparatus performs image projection, usually, the light valve thereof converts an illumination beam into an image beam and reflects the image beam to a projection lens, where the image beam is projected by the projection lens onto a screen to form images. Along with the thin-shape design tendency of the volume of a projection apparatus however, distances between optical components inside the projection apparatus become shorter and shorter. As a result, when a beam is transmitted into a projection apparatus, stray light is easily produced since the distances between the optical components thereof are too close.

Taiwan Patent No. 1325091 discloses a projection apparatus, and the projection apparatus includes an illumination system, a digital micro-mirror device (DMD), a projection lens, and a total internal reflection prism (TIR prism), wherein the illumination system includes a plurality of lenses. Taiwan Patent No. 1292509 discloses another projection apparatus, and the projection apparatus has an illumination system, a DMD, and a projection lens, wherein the illumination system includes a light source, a light integrator (LID), lenses, and a reflective plate. In addition, Taiwan Patent No. M314352 discloses a projection display apparatus, and the projection display apparatus includes a light source, a light valve, a set of prisms, and a projection lens. The set of prisms comprises a first prism and a second prism. In terms of reducing stray light however, the efficiencies of the above-mentioned conventional architectures are very limited.

SUMMARY OF THE INVENTION

Accordingly, the invention is directed to a projection apparatus, and the projection apparatus is able to reduce the stray light phenomena so as to have good imaging quality.

Other objectives and advantages of the invention should be further indicated by the disclosed technical features of the invention.

To achieve one of, a part of or all of the above-mentioned objectives, or to achieve other objectives, an embodiment of the invention provides a projection apparatus including an illumination system, a light valve, a light beam adjusting element, and a light reflective unit. The illumination system is capable of providing an illumination beam. The light reflective unit is disposed on a transmission path of the illumination beam. The light valve is disposed on the transmission path of the illumination beam and located between the illumination system and the light reflective unit, wherein the light valve has an active surface and the active surface is capable of converting the illumination beam from the light reflective unit into an image beam. The light beam adjusting element is disposed on the transmission path of the illumination beam and located between the illumination system and the light valve, and the light beam adjusting element is capable of reflecting a light from the light valve, wherein the light is not the image beam.

Based on the description above, the embodiment of the invention may achieve at least one of following advantages or efficiencies. In the projection apparatus of the embodiment of the invention, the optical axis of the light beam adjusting element and the normal vector of the active surface of the light valve are not perpendicular to each other, so that after the light inexpectant to form the image beam and reflected by the light valve is transmitted to the light beam adjusting element, the light would be reflected by the light beam adjusting element and unable to enter the projection lens. Therefore, the invented projection apparatus has good imaging quality.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
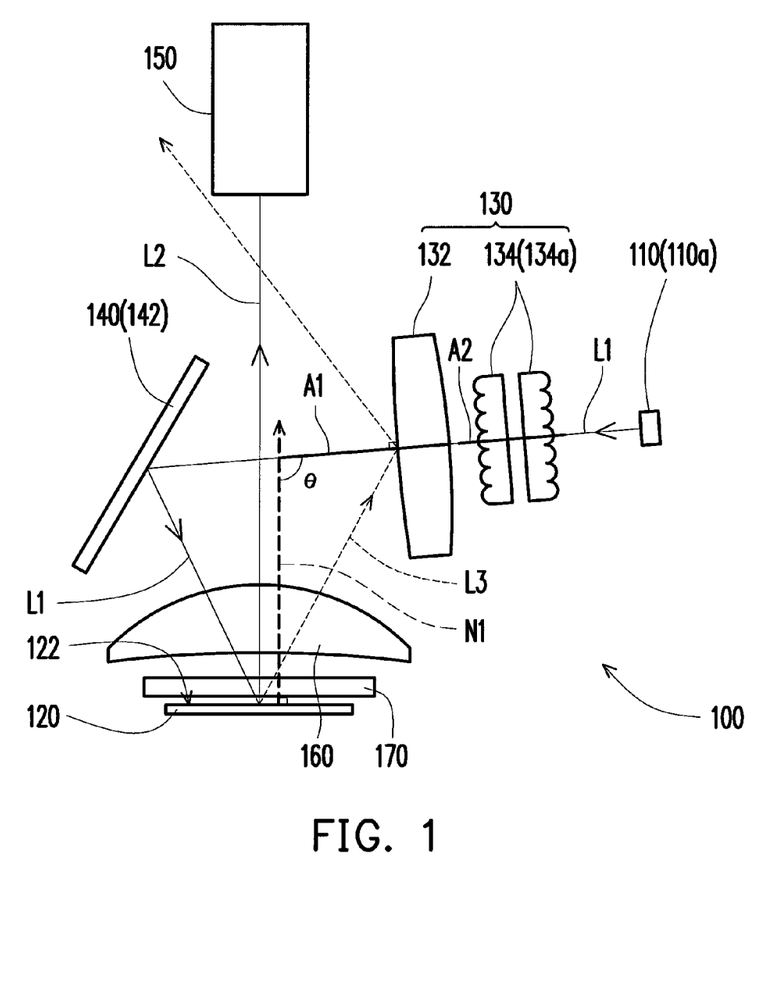
FIG. 1 is a diagram of a projection apparatus according to an embodiment of the invention.

Referring to FIG. 1, a projection apparatus 100 of the embodiment includes an illumination system 110, a light valve 120, a light beam adjusting element 130, and a light reflective unit 140. The illumination system 110 is capable of providing an illumination beam L1. In the embodiment, the illumination system 110 has at least one light source and the light source may be a light emitting diode (LED), an ultra high pressure lamp (UHP lamp) or other appropriate light sources.

The light valve 120 is disposed on a transmission path of the illumination beam L1 and located between the illumination system 110 and the light reflective unit 140. The light valve 120 has an active surface 122 capable of converting the illumination beam L1 from the light reflective unit 140 into an image beam L2. In the embodiment, the light valve 120 is, for example, a digital micro-mirror device (DMD) for exemplary depiction; but in other embodiments, the light valve 120 may be a liquid-crystal-on-silicon panel (LCOS panel).

The light beam adjusting element 130 is disposed on the transmission path of the illumination beam L1 and located between the illumination system 110 and the light valve 120. In more details, the light beam adjusting element 130 includes at least a lens 132, wherein the lens 132 has a first optical axis A1, and the first optical axis A1 and a normal vector N1 of the active surface 122 are not perpendicular to each other. For example, the included angle θ between the first optical axis A1 and the normal vector N1 of the active surface 122 is not equal to 90°. In the embodiment, the included angle θ between the first optical axis A1 of the lens 132 and the normal vector N1 of the active surface 122 substantially falls in an angle scope greater than or equal to 91.5° and less than or equal to 120°.

Continuing to FIG. 1, the light beam adjusting element 130 of the embodiment may further include a light uniforming element 134. The light uniforming element 134 is disposed on the transmission path of the illumination beam L1 and located between the lens 132 and the illumination system 110, wherein the light uniforming element 134 has a second optical axis A2. In the embodiment, the light uniforming element 134 is, for example, a lens array 134a shown in FIG. 1 for exemplary depiction. The lens array 134a may include two sub lens arrays. The light uniforming element 134 functions for both advancing the light uniformity of the illumination beam L1 passing through the lens array 134a and adjusting the light radiation pattern of the illumination beam L1 passing through the light uniforming element 134. In more details, if the active surface 122 of the light valve 120 has a rectangular shape, it is preferred that the light radiation pattern of the illumination beam L1 transmitted to the light valve 120 is a rectangular shape as well. The method to adjust the light radiation pattern of the illumination beam L1 may be implemented by means of the light uniforming element 134.

The second optical axis A2 of the light uniforming element 134 is, for example, parallel to the first optical axis A1. In other words, the optical axes (i.e., the second optical axis A2 and the first optical axis A1) of the light uniforming element 134 and the lens 132 substantially overlap the optical axis of the illumination system 110.

On the other hand, the light reflective unit 140 is disposed on the transmission path of the illumination beam L1. In the embodiment, the light reflective unit 140 is, for example, the reflective mirror 142 shown in FIG. 1 for exemplary depiction, wherein the reflective mirror 142 is disposed on the transmission path of the illumination beam L1 but is not located on a transmission path of the image beam L2.

Further continuing to FIG. 1, in the embodiment, the projection apparatus 100 may include a projection lens 150, and the projection lens 150 is disposed on the transmission path of the image beam L2. Furthermore, the projection apparatus 100 further includes a field lens 160, wherein the field lens 160 is used to converge the image beam L2 and transmit the image beam L2 to the projection lens 150. The field lens 160 is disposed on the transmission paths of the illumination beam L1 and the image beam L2, located between the light beam adjusting element 130 and the light valve 120, and located between the light valve 120 and the projection lens 150. In addition, a glass cap 170 may be disposed in front of the light valve 120 for protecting the light valve 120.

In more details, when the projection apparatus 100 performs image projection, the light valve 120 converts the illumination beam L1 into the image beam L2 and reflects the image beam L2 to the projection lens 150, where the image beam L2 is projected by the projection lens 150 onto a screen (not shown) to form images. When the light valve 120 is in on-state, usually, the projection apparatus 100 may project the image beam L2 onto the screen.

However, when the projection apparatus 100 is attempted to produce a dark frame or temporarily does not produce images, the light valve 120 may be switched to off-state so that the illumination beam L1 from the light reflective unit 140 may not be reflected to the projection lens 150; in more details, at the time, after the illumination beam L1 from the light reflective unit 140 is reflected by the light valve 120, the reflected light (i.e., the light produced after the illumination beam L1 sequentially passes through the light beam adjusting element 130, is reflected by the light reflective unit 140, and then is reflected by the light valve 120, wherein the produced light is not the image beam L2) forms a stray light beam L3. The stray light beam L3 may be reflected by the light beam adjusting element 130 and is unable to be transmitted to the projection lens 150. As a result, no stray light spot is produced on the screen.

Figure 2A:
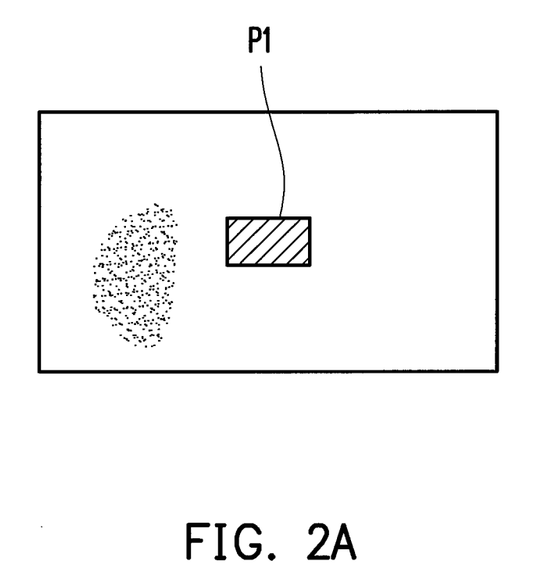
FIG. 2A is a diagram showing the imaging on a screen by a conventional projection apparatus where the included angle between the optical axis of the lens and the normal vector of the active surface is 90°.

In tradition, when the light valve is in off-state, the stray light beam reflected by the light valve is easily transmitted to the projection lens, so that the image projected on the screen is likely affected by the stray light, as shown in FIG. 2A. It may be seen from FIG. 2A, many light spots caused by the stray light beam are present at the left side of an imaging region P1 on the screen by using a conventional projection apparatus.

Figure 2B:
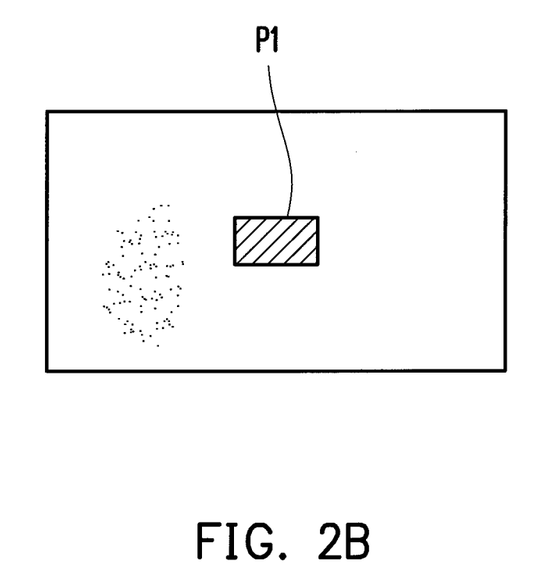
FIG. 2B is a diagram showing the imaging on a screen by a projection apparatus of the embodiment where the included angle between the optical axis of the lens and the normal vector of the active surface is not 90°.

On the other hand, as shown by FIG. 1, in the projection apparatus 100 of the embodiment, the included angle θ between the first optical axis A1 of the lens 132 and the normal vector N1 of the active surface 122 of the light valve 120 is, for example, not equal to 90°. Thus, when the light valve 120 is in off-state, the stray light beam L3 produced after the illumination beam L1 is reflected to the light valve 120 may be reflected by the lens 132 so as to deviate and thereby the stray light beam L3 is unable to be transmitted to the projection lens 150. In this way, the distribution and the density of the stray light spots at the left side of the imaging region P1 on the screen by using the projection apparatus 100 of the embodiment (as shown in FIG. 2B) would be largely improved in comparison with the distribution and the density of the stray light spots produced by the traditional projection apparatus (as shown in FIG. 2A). For example, if the design value of the included angle θ is specified as 90° adopted by the traditional projection apparatus, the stray light spots at the left side of the imaging region P1 on the screen may be up to 9.84%; for the projection apparatus 100 of the embodiment, when the design value of the included angle θ is specified as, for example, 100° (not equal to 90°), the efficiency of the stray light spots at the left side of the imaging region P1 on the screen may be largely reduced to 0.694%, which means an effect almost without stray light spots may be achieved. In other words, following the design idea of the embodiment, almost all of the stray light beam L3 may be reflected by the lens 132. The stray light beam L3 shown in FIG. 1 deviates, for example, to the left side of the projection lens 150 and consequently does not enter the projection lens 150. Therefore, the projection apparatus 100 is able to produce good projection quality and good image frames.

Figure 3:
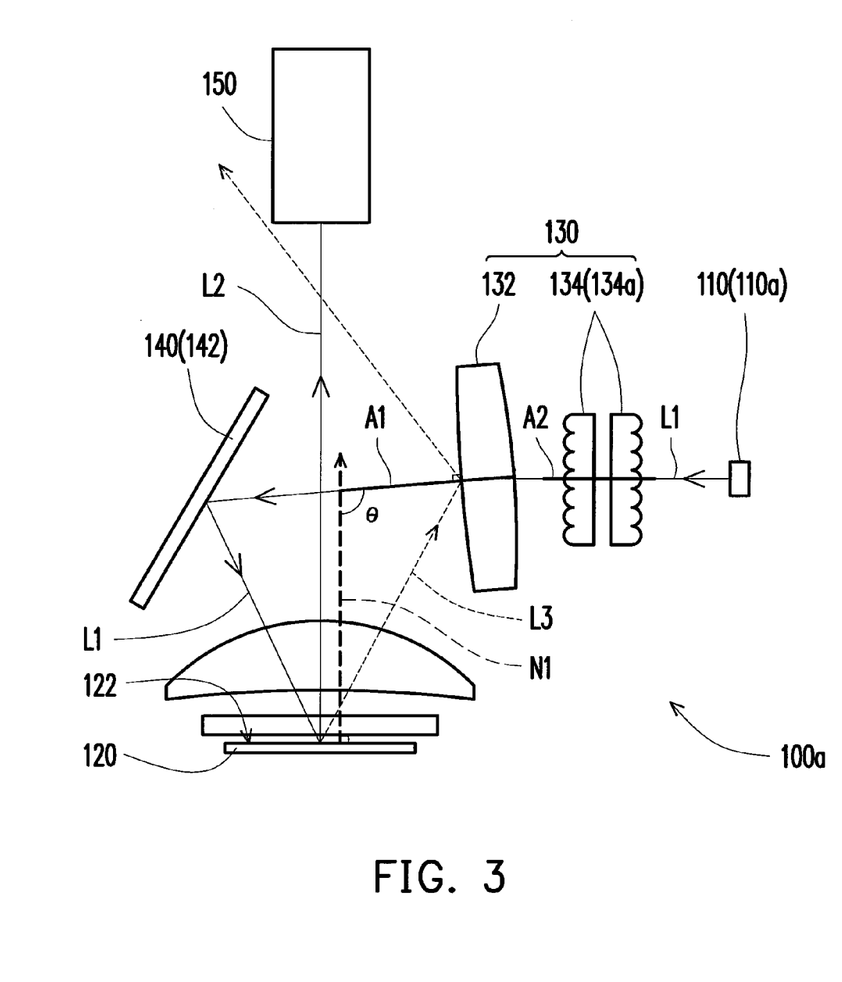
FIG. 3 is a diagram of a projection apparatus according to another embodiment of the invention.

Referring to FIGS. 1 and 3, the projection apparatus 100a of the embodiment adopts the same design idea as the above-mentioned projection apparatus 100 and the similar structure thereto except that the second optical axis A2 of the light uniforming element 134 of the projection apparatus 100a is substantially not parallel to the first optical axis A1 of the lens 132. That is to say, in FIG. 3, the two optical axes (i.e., the second optical axis A2 and the first optical axis A1) of the light uniforming element 134 and the lens 132 do not overlap the optical axis of the illumination system 110. However, the projection apparatus 100a of the embodiment has the same advantages of the projection apparatus 100, which is omitted to describe.

Figure 4:
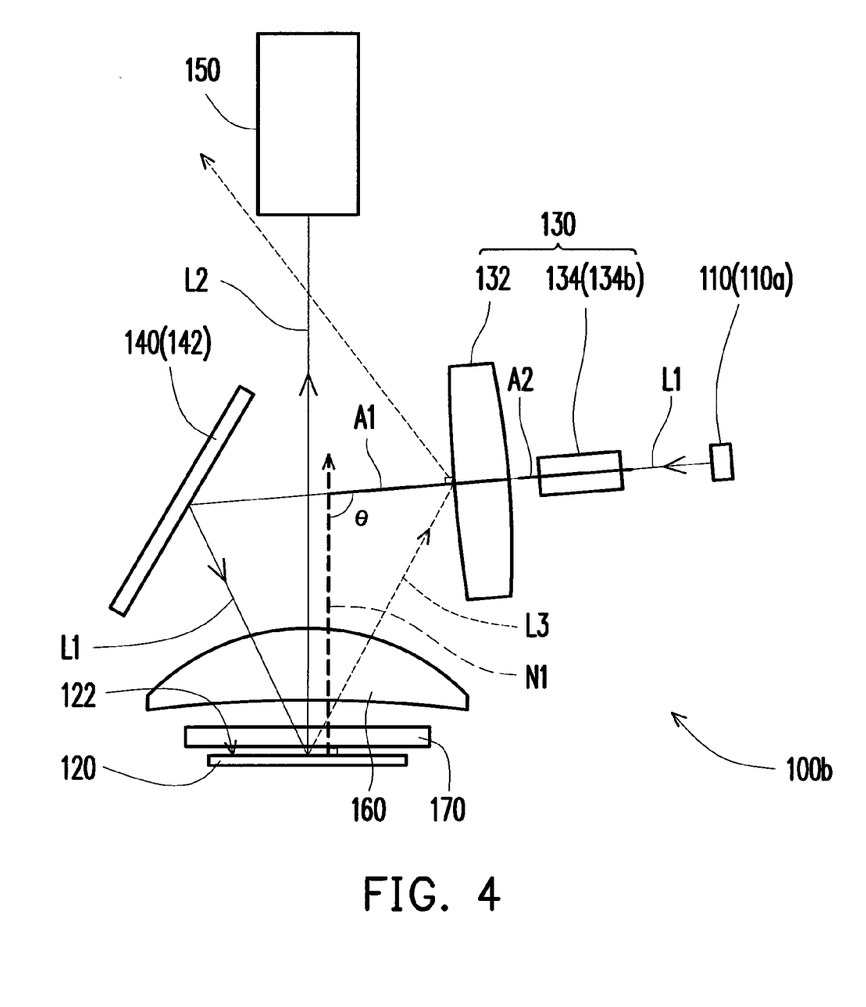
FIG. 4 is a diagram of a projection apparatus according to yet another embodiment of the invention.

Referring to FIGS. 1 and 4, the projection apparatus 100b of the embodiment adopts the same design idea as the above-mentioned projection apparatus 100 and the similar structure thereto except that the light uniforming element 134 of the projection apparatus 100b is a light integrator (LIR) 134b. The LIR 134b functions not only to uniform the illumination beam L1 passing through the lens array 134a but also to adjust the light radiation pattern of the illumination beam L1 passing through the light uniforming element 134 so as to suit the shape of the active surface 122 of the light valve 120. In addition, in the projection apparatus 100b, a plurality of lenses 132 are used (for example, two to four lenses are used, which are not shown) to associate with the LIR 134b for advancing the image quality. However, the projection apparatus 100b of the embodiment has the same advantages of the projection apparatus 100, which is omitted to describe.

It should be noted that the projection apparatus 100b may also adopt the structure design of the above-mentioned projection apparatus 100a. That is to say, in the projection apparatus 100b, the second optical axis A2 of the light uniforming element 134 may be substantially not parallel to the first optical axis A1 of the lens 132, wherein the design is determined according to the requirement of the user, and the invention does not limit.

Figure 5:
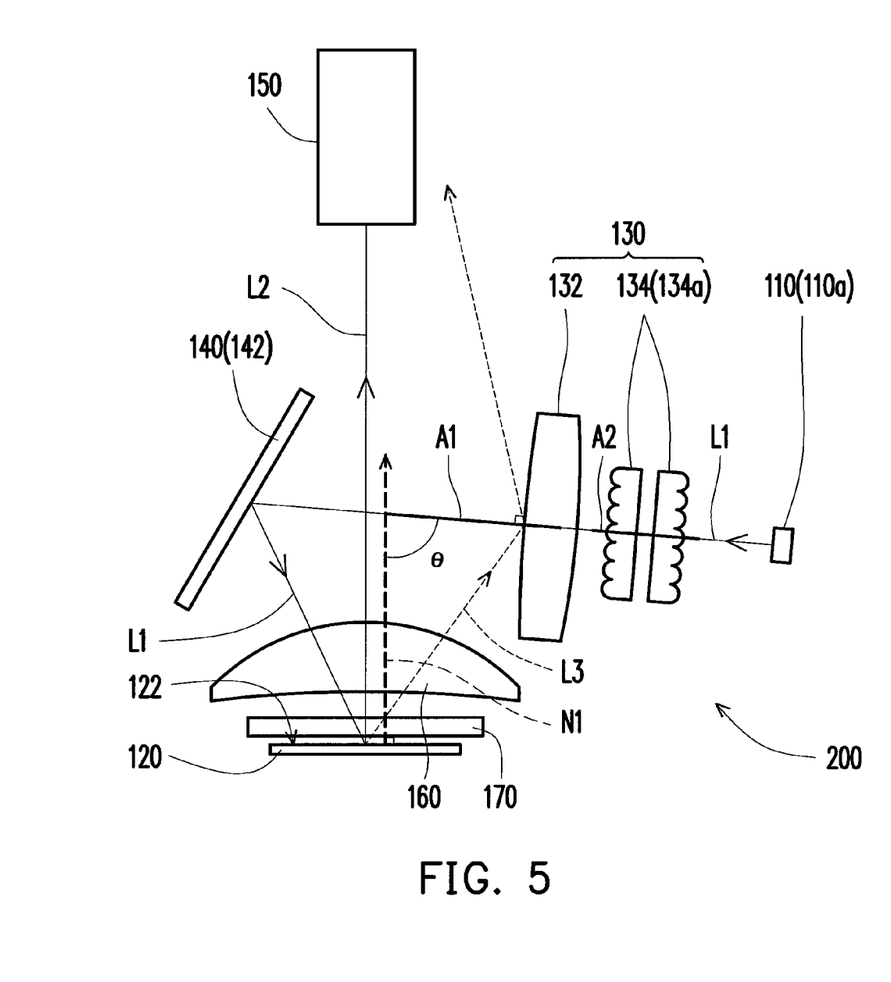
FIG. 5 is a diagram of a projection apparatus according to yet another embodiment of the invention.

Referring to FIGS. 1 and 5, the projection apparatus 200 of the embodiment adopts the same design idea as the above-mentioned projection apparatus 100 and the similar structure thereto, i.e., the included angle θ between the optical axis A1 of the lens 132 and the normal vector N1 of the active surface 122 of the light valve 120 is not equal to 90°. The difference between the projection apparatus 200 from the projection apparatus 100 rests in that the included angle θ in FIG. 5 substantially falls in an angle scope greater than or equal to 70° and less than or equal to 88.5°. In more details, since the included angle θ substantially falls in an angle scope greater than or equal to 70° and less than or equal to 88.5°, hence, almost all of the stray light beam L3 after being reflected by the lens 132 deviates to the right side of the projection lens 150 and does not enter the projection lens 150, as shown in FIG. 5. In other words, the projection apparatus 200 of the embodiment adopts the similar design idea to the projection apparatus 100, but the lens 132 thereof is rotated to a different angle direction, so that the value of the included angle θ falls in a different angle scope and the projection apparatus 200 consequently has the advantages of the projection apparatus 100, which is omitted to describe.

Figure 6:
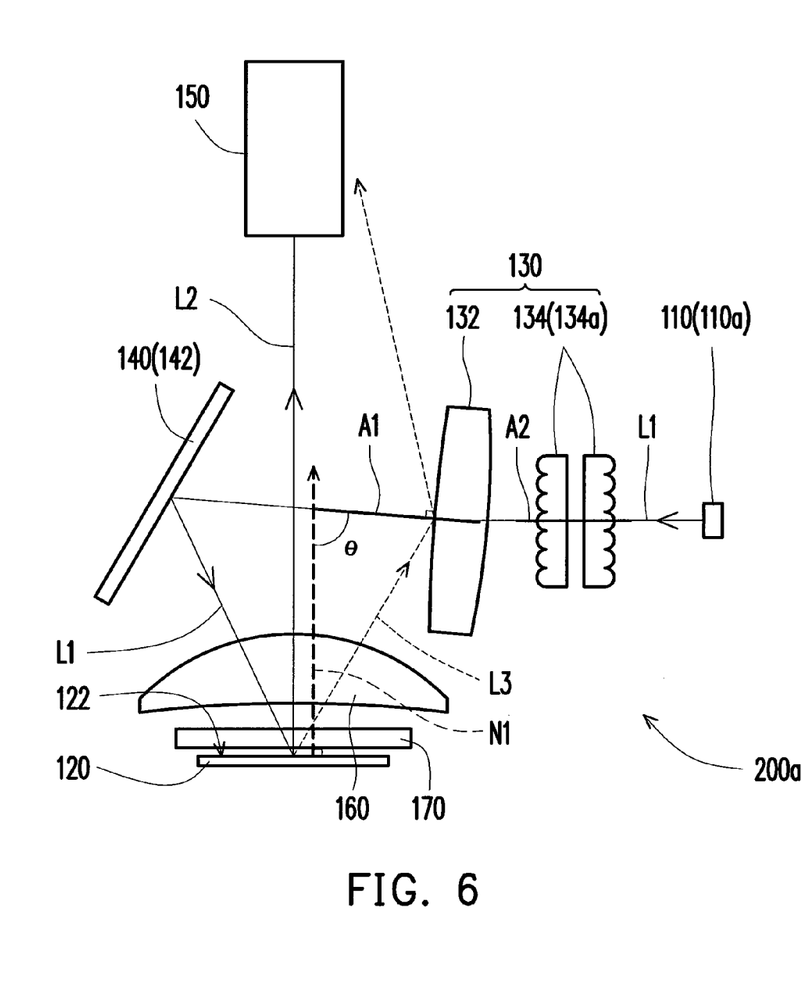
FIG. 6 is a diagram of a projection apparatus according to yet another embodiment of the invention.

Referring to FIGS. 5 and 6, the projection apparatus 200a of the embodiment adopts the same design idea as the above-mentioned projection apparatus 200 and the similar structure thereto except that the second optical axis A2 of the light uniforming element 134 of the projection apparatus 200a is substantially not parallel to the first optical axis A1 of the lens 132. That is to say, the two optical axes (i.e., the second optical axis A2 and the first optical axis A1) of the light uniforming element 134 and the lens 132 in FIG. 6 and the optical axis of the illumination system 110 do not overlap each other. However, the projection apparatus 200a of the embodiment has the advantages of the projection apparatus 200, which is omitted to describe.

Figure 7:
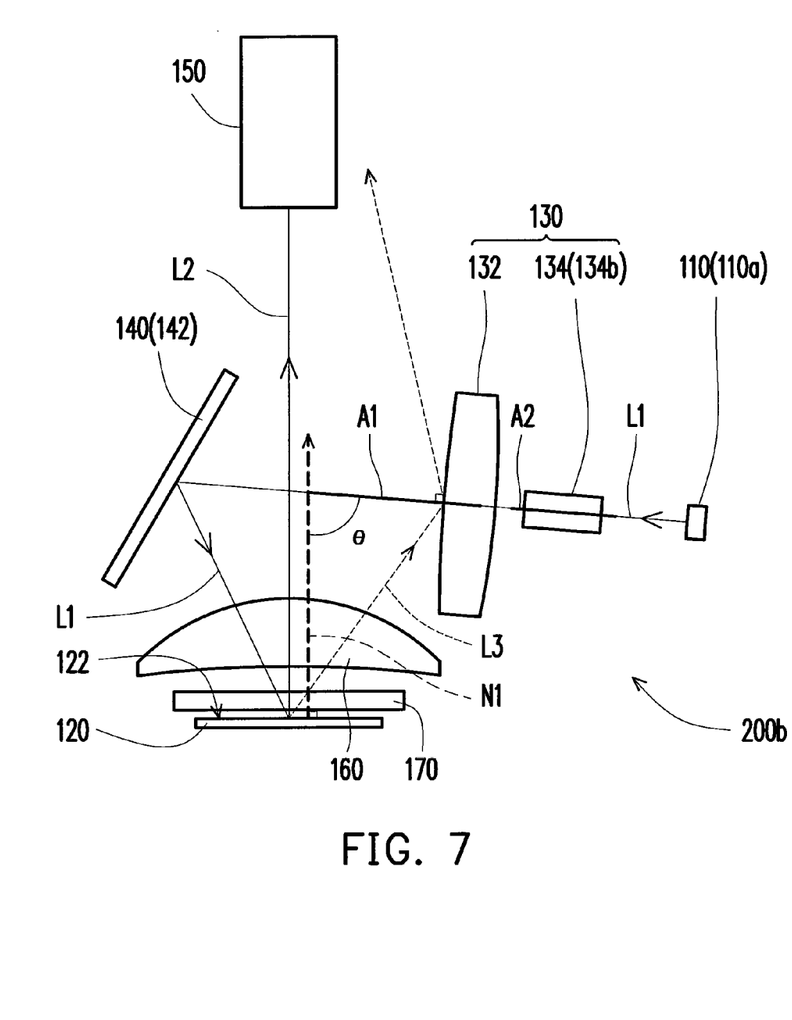
FIG. 7 is a diagram of a projection apparatus according to yet another embodiment of the invention.

Referring to FIGS. 5 and 7, the projection apparatus 200b of the embodiment adopts the same design idea as the above-mentioned projection apparatus 200 and the similar structure thereto except that the light uniforming element 134 of the projection apparatus 200b is an LIR 134b. The LIR 134b functions not only to uniform the illumination beam L1 passing through the lens array 134a but also to adjust the light radiation pattern of the illumination beam L1 passing through the light uniforming element 134 so as to suit the shape of the active surface 122 of the light valve 120. However, the projection apparatus 200b of the embodiment has the same advantages of the projection apparatus 200, which is omitted to describe.

It should be noted that the projection apparatus 200b may also adopt the structure design of the above-mentioned projection apparatus 200a. That is to say, in the projection apparatus 200b, the second optical axis A2 of the light uniforming element 134 may be substantially not parallel to the first optical axis A1 of the lens 132, wherein the design is determined according to the requirement of the user, and the invention does not limit.

In the above-mentioned projection apparatuses 100, 100a, 100b, 200, 200a, and 200b, the light reflective unit 140 is implemented by, for example, the reflective mirror 142 and the configuration is for exemplary depiction purpose. In other implementation configurations, the total internal reflection prism (TIR prism) may be adopted as the implemented sample of the light reflective unit 140, referring to the depiction of the projection apparatus 300 in FIG. 8.

Figure 8:
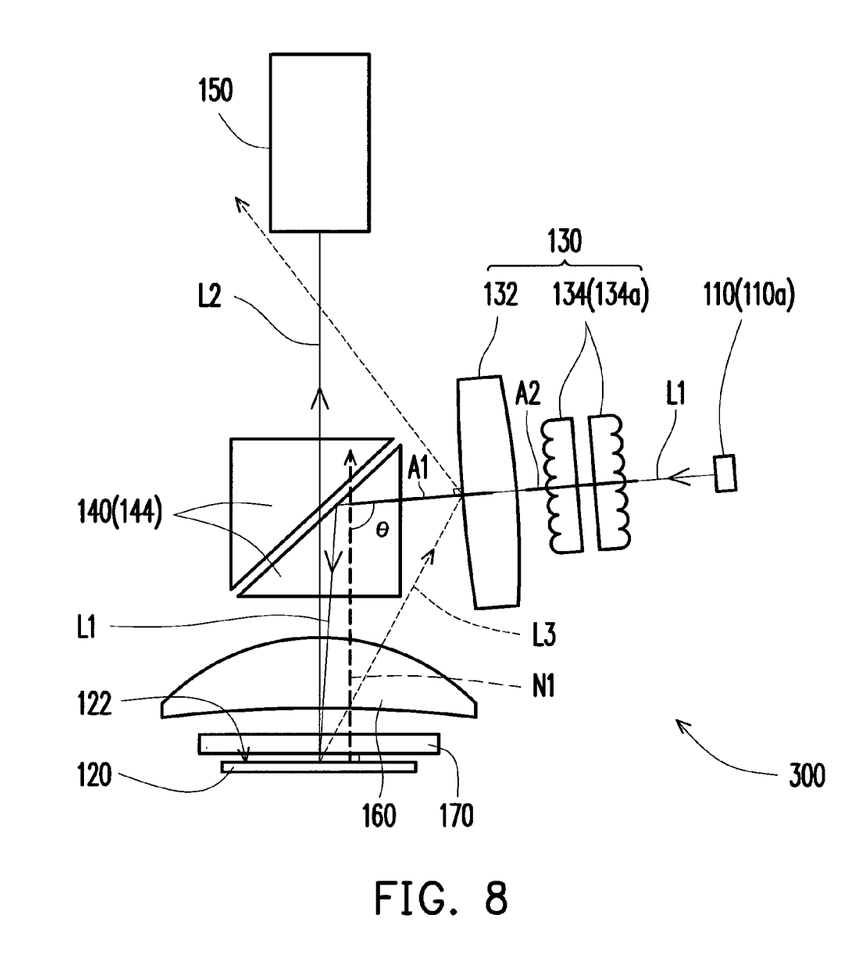
FIG. 8 is a diagram of a projection apparatus where an implementation configuration employing a total internal reflection prism (TIR prism) is adopted.

Referring to FIGS. 1 and 8, the projection apparatus 300 of the embodiment adopts the same design idea as the above-mentioned projection apparatus 100 and the similar structure thereto except that the light reflective unit 140 of the projection apparatus 300 is a TIR prism 144 disposed on the transmission paths of the illumination beam L1 and the image beam L2 and located between the light beam adjusting element 130 and the light valve 120 and between the light valve 120 and the projection lens 150. In more details, the illumination beam L1 passing through the lens 132 would be totally reflected by the TIR prism 144 so as to be transmitted onto the light valve 120. Then, the light valve 120 converts the illumination beam L1 into the image beam L2 and reflects the image beam L2 back to the TIR prism 144. At the time, the image beam L2 may pass through the TIR prism 144 to be transmitted to the projection lens 150 and further be projected onto the screen by the projection lens 150 to form images. However, the projection apparatus 300 of the embodiment has the same advantage of the projection apparatus 100, which is omitted to describe.

It should be noted that the above-mentioned architecture by using the TIR prism 144 to replace the above-mentioned plane mirror 142 may be also used in the above-mentioned projection apparatuses 100a, 100b, 200, 200a or 200b, which is omitted to describe.

Figure 9:
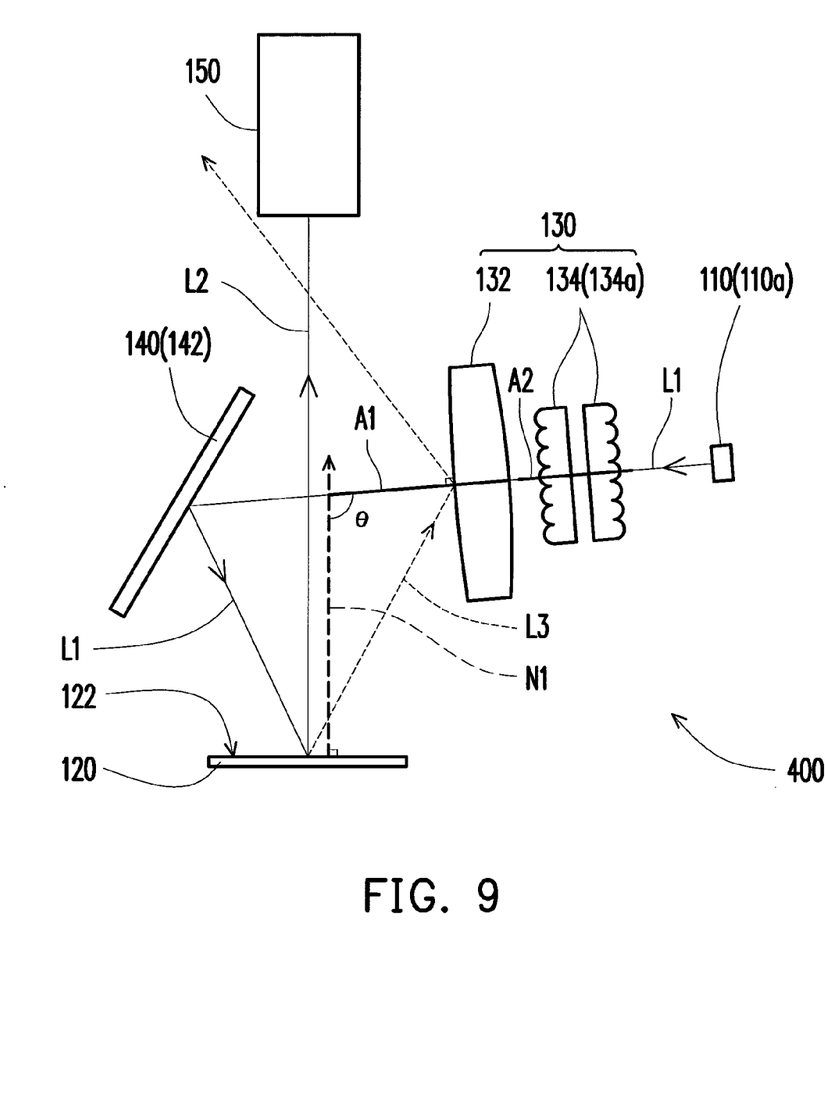
FIG. 9 is a diagram of a projection apparatus without employing a field lens and a glass cap.

In addition, in the above-mentioned projection apparatuses 100, 100a, 100b, 200, 200a, and 200b, for example, a field lens 160 and a glass cap 170 are employed as exemplary embodiments; but in other implemented configurations, an architecture without employing the field lens 160 or the glass cap 170 is permitted as well. For example, the projection apparatus 400 shown in FIG. 9 adopts architecture without employing the field lens 160 or the glass cap 170, which may be seen as one of the examples. In more details, the field lens 160 is used to converge the image beam L2 and then transmit the image beam L2 to the projection lens 150, and the glass cap 170 is used to protect the light valve 120. It may be seen that when the projection apparatus 400 does not have the field lens 160 and the glass cap 170, the projection apparatus 400 would not be affected and still function for projecting and imaging. However, the projection apparatus 400 of the embodiment has the same advantages of the projection apparatus 100, which is omitted to describe. It should be noted that any one of the above-mentioned projection apparatuses 100, 100a, 100b, 200, 200a and 200b may adopt the architecture without employing the field lens 160 or the glass cap 170, and the architecture still has the efficiency of the above-mentioned embodiments that almost all of the stray light beam L3 is unable to enter the projection lens 150.

Figure 10:
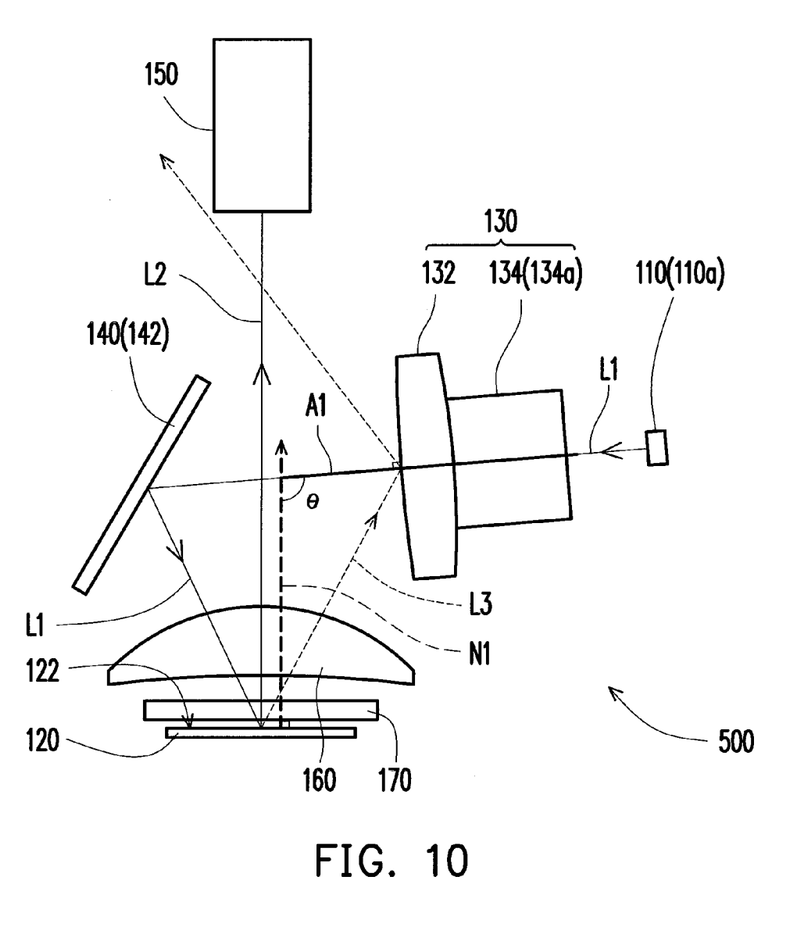
FIG. 10 is a diagram of a projection apparatus where a light uniforming element adheres to a lens.

In addition, in the above-mentioned projection apparatuses 100, 100a, 100b, 200, 200a, 200b, 300, and 400, the light uniforming element 134 and the lens 132 are two optical components separated from each other and independent of each other. However in other embodiments, for example in the projection apparatus 500 shown in FIG. 10, the light uniforming element 134 and the lens 132 adhere to each other. That is to say, there is no gap between the light uniforming element 134 and the lens 132. The materials of the light uniforming element 134 and the lens 132 of the projection apparatus may be the same or different from each other, wherein when the materials of the light uniforming element 134 and the lens 132 are the same, they may be in integrated formation design.

Besides, in the above-mentioned projection apparatuses 100, 100a, 100b, 200, 200a, 200b, 300, 400, and 500, the illumination system 110 is, for example, a white light source 110a for exemplary depiction. In other embodiments, the above-mentioned illumination system 110 may be the illumination system 110b and the illumination system 110c respectively shown by FIGS. 11A and 11B, and the details are depicted as following.

Figure 11A:
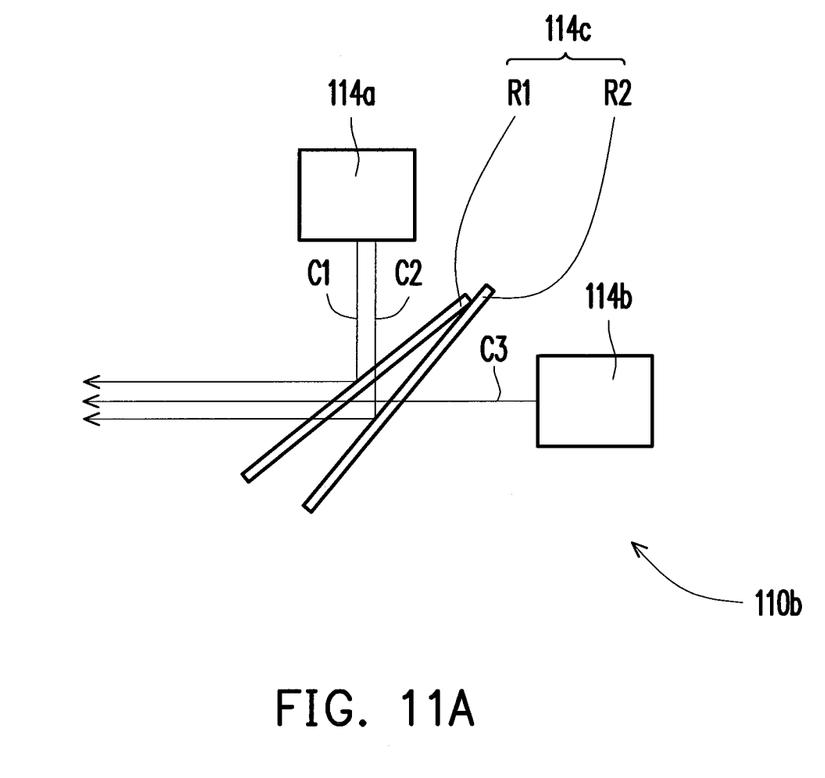
FIGS. 11A and 11B are diagrams of illumination systems according to other implementation configurations.

In the implementation configuration shown by FIG. 11A, the illumination system 110b includes a first light source 114a, a second light source 114b, and a light combining element 114c. The first light source 114a is capable of providing a first color light beam C1 and a second color light beam C2, and the second light source 114b is capable of providing a third color light beam C3. The light combining element 114c is capable of reflecting the first color light beam C1 and the second color light beam C2 from the first light source 114a, while the third color light beam C3 from the second light source 114b is capable of passing through the light combining element 114c. In more details, the light combining element 114c includes a first reflective element R1 and a second reflective element R2. The first reflective element R1 and the second reflective element R2 are disposed side-by-side and are uncrossed, wherein the first reflective element R1 reflects the first color light beam C1, the second reflective element R2 reflects the second color light beam C2, and the third color light beam C3 passes through the first reflective element R1 and the second reflective element R2.

In the illumination system 110b, the first light source 114a is, for example, an LED able to emit bi-colors lights and the second light source 114b is, for example, an LED able to emit mono-color light beam. In more details, the first color light beam C1, the second color light beam C2, and the third color light beam C3 are respectively red light, blue light, and green light. By means of the light combining element 114c, the first color light beam C1 and the second color light beam C2 are reflected respectively by the first reflective element R1 and the second reflective element R2 while the third color light beam C3 passes through the first reflective element R1 and the second reflective element R2. As a result, the three color light beams are combined into a white light.

In the above-mentioned illumination system 110b, the first light source 114a and the second light source 114b are two independent devices. In other embodiments, the illumination system may adopt a single light source able to emit three color light beams (not shown), wherein the single light source works together with the light combining element 114c having the first reflective element R1 and the second reflective element R2 so as to substantially achieve the same effect of the above-mentioned illumination system 110b.

In other embodiments, a light combining element having three reflective elements may be adopted (not shown), wherein the three reflective elements are disposed side-by-side and are uncrossed to respectively reflect the three color light beams. Certainly, the present invention does not limit the composing structure and the quantity of the light sources to produce the three color light beams.

Figure 11B:
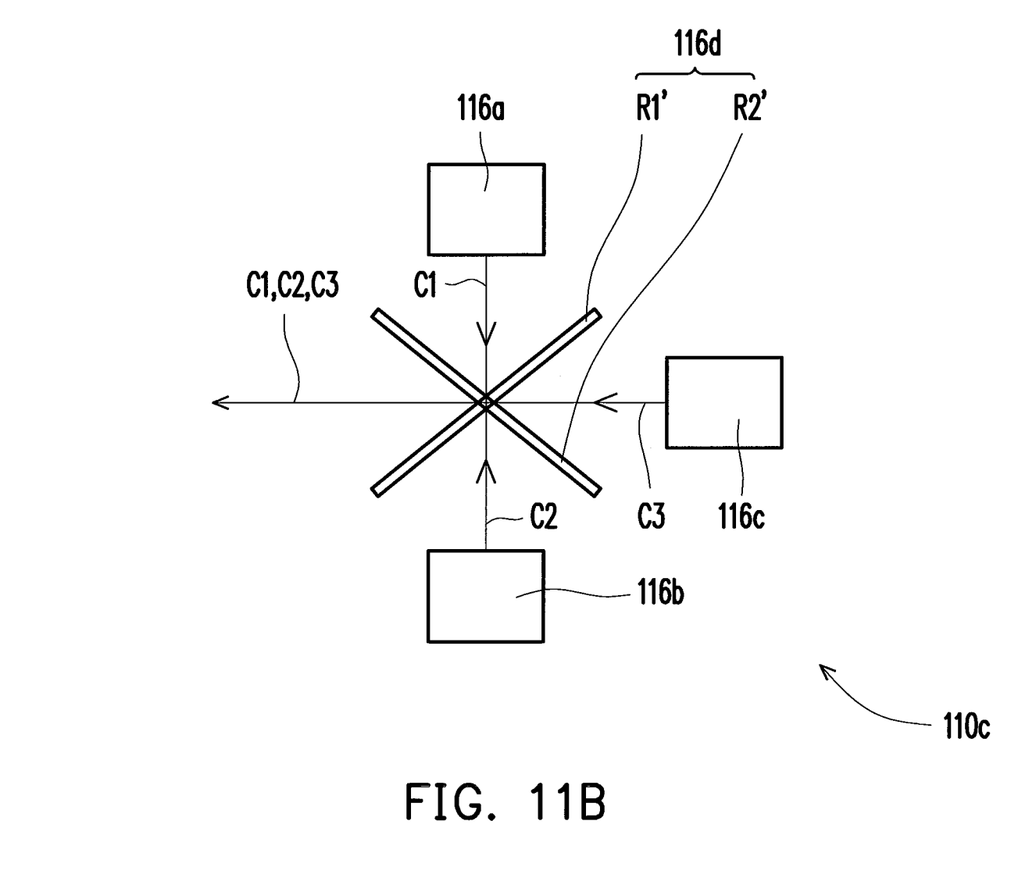

In the implementation configuration shown by FIG. 11B, the illumination system 110c includes a first light source 116a, a second light source 116b, a third light source 116c, and a light combining element 116d. The first light source 116a is capable of providing a first color light beam C1, the second light source 116b is capable of providing a second color light beam C2, and the third light source 116c is capable of providing a third color light beam C3. The light combining element 116d is capable of reflecting the first color light beam C1 and the second color light beam C2, while the third color light beam C3 is capable of passing through the light combining element 116d. In more details, the light combining element 116d includes a first reflective element R1' and a second reflective element R2'. The first reflective element R1' and the second reflective element R2' are crossed, wherein the first reflective element R1' reflects the first color light beam C1, the second reflective element R2' reflects the second color light beam C2, and the third color light beam C3 passes through the first reflective element R1' and the second reflective element R2'.

In the illumination system 110c, the first light source 116a, the second light source 116b, and the third light source 116c are respectively, for example, an LED able to emit red light, an LED able to emit blue light, and an LED able to emit green light. Similarly, by means of the light combining element 116d, the first color light beam C1 and the second color light beam C2 are reflected respectively by the first reflective element R1' and the second reflective element R2' while the third color light beam C3 passes through the first reflective element R1' and the second reflective element R2'. As a result, the three color light beams are combined into a white light.

In the above-mentioned illumination system 110c, the first light source 116a, the second light source 116b, and the third light source 116c are, for example, three independent devices. In other embodiments, the illumination system may adopt a single light source able to emit three color light beams (not shown), wherein the single light source works together with the light combining element 116d having the first reflective element R1' and the second reflective element R2' so as to substantially achieve the same effect of the above-mentioned illumination system 110c.

It should be noted that the above-mentioned illumination systems (for example, 110b, 110c, and the like) may be used in any one architecture of the above-mentioned projection apparatuses 100, 100a, 100b, 200, 200a, 200b, 300, 400, and 500, which is omitted to describe.

In summary, the embodiments of the present invention may achieve at least one of the following advantages or efficiencies. In the embodiments of the present invention, the included angle between the optical axis of the lens in the light beam adjusting element and the normal vector of the active surface of the light valve is not equal to 90°, so that the light beam adjusting element is able to reflect the stray light beam reflected by the light valve to a position deviating the projection lens and the stray light beam consequently does not enter the projection lens. In other words, since the stray light beam does not enter the projection lens, hence the stray light spots on the projection screen are largely reduced. In this way, even the volume of the projection apparatus is designed with the thin-shape tendency and the distances between optical components inside the projection apparatus gets shorter and shorter, the expected efficiency of reducing even eliminating the stray light beam may be easily achieved. In the embodiments of the present invention, the included angle between the optical axis of the lens in the light beam adjusting element and the normal vector of the active surface of the light valve substantially falls in an angle scope greater than or equal to 91.5° and less than or equal to 120°; in other embodiments of the invention, the included angle between the optical axis of the lens in the light beam adjusting element and the normal vector of the active surface of the light valve substantially falls in an angle scope greater than or equal to 70° and less than or equal to 88.5°. In overall speaking, the projection apparatuses of the embodiments have good imaging quality.

It will be apparent to those skilled in the art that the descriptions above are several preferred embodiments of the invention only, which does not limit the implementing range of the invention. Various simple and equivalent modifications and variations can be made to the structure of the invention without departing from the scope or spirit of the invention. The claim scope of the invention is defined by the claims hereinafter. In addition, any one of the embodiments or claims of the invention is not necessarily achieve all of the above-mentioned objectives, advantages or features. The abstract and the title herein are used to assist searching the documentations of the relevant patents, not to limit the claim scope of the invention. Moreover, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A projection apparatus, comprising:
   an illumination system, capable of providing an illumination beam;
   a light reflective unit, disposed on a transmission path of the illumination beam;
   a light valve, disposed on the transmission path of the illumination beam and located between the illumination system and the light reflective unit, wherein the light valve has an active surface and the active surface is capable of converting the illumination beam from the light reflective unit into an image beam; and
   a light beam adjusting element, disposed on the transmission path of the illumination beam and located between the illumination system and the light valve, and the light beam adjusting element being capable of reflecting a light from the light valve, wherein the light is not the image beam,
   wherein the light beam adjusting element comprises:
   at least a lens, having a first optical axis, wherein an included angle between the first optical axis and a normal vector of the active surface is not equal to 90°,
   wherein the included angle between the first optical axis and the normal vector of the active surface substantially falls in an angle scope greater than or equal to 91.5° and less than or equal to 120°.

2. The projection apparatus as claimed in claim 1, wherein the light beam adjusting element further comprises:
   a light uniforming element, disposed on the transmission path of the illumination beam and located between the lens and the illumination system, and having a second optical axis.

3. The projection apparatus as claimed in claim 2, wherein the second optical axis is substantially parallel to the first optical axis.

4. The projection apparatus as claimed in claim 2, wherein the second optical axis is substantially not parallel to the first optical axis.

5. The projection apparatus as claimed in claim 2, wherein the light uniforming element is a light integrator.

6. The projection apparatus as claimed in claim 2, wherein the light uniforming element comprises at least a lens array.

7. The projection apparatus as claimed in claim 2, wherein the light uniforming element and the lens are separated from each other, adhered to each other or integrated formed.

8. The projection apparatus as claimed in claim 1, further comprising:
   a projection lens, disposed on the transmission path of the image beam.

9. The projection apparatus as claimed in claim 8, wherein the light reflective unit comprises:
   a total internal reflection prism, disposed on the transmission paths of the illumination beam and the image beam, located between the light beam adjusting element and the light valve, and located between the light valve and the projection lens.

10. The projection apparatus as claimed in claim 8, further comprising:
a field lens, disposed on the transmission paths of the illumination beam and the image beam, located between the light beam adjusting element and the light valve, and located between the light valve and the projection lens.

11. The projection apparatus as claimed in claim 1, wherein the light reflective unit comprises:
a reflective mirror, disposed on the transmission path of the illumination beam, but not located on the transmission path of the image beam.

12. The projection apparatus as claimed in claim 1, wherein the illumination system comprises a white light source.

13. The projection apparatus as claimed in claim 1, wherein the illumination system comprises:
a first light source, capable of providing a first color light beam and a second color light beam;
a second light source, capable of providing a third color light beam; and
a light combining element, capable of reflecting the first color light beam and the second color light beam, wherein the third color light beam is capable of passing through the light combining element.

14. The projection apparatus as claimed in claim 13, wherein the light combining element comprises:
a first reflective element, reflecting the first color light beam; and
a second reflective element, wherein the second reflective element and the first reflective element are disposed side-by-side and are uncrossed, the second reflective element reflects the second color light beam, and the third color light beam passes through the first reflective element and the second reflective element.

15. The projection apparatus as claimed in claim 13, wherein the first light source and the second light source are respectively light emitting diodes.

16. The projection apparatus as claimed in claim 1, wherein the illumination system comprises:
a first light source, capable of providing a first color light beam;
a second light source, capable of providing a second color light beam;
a third light source, capable of providing a third color light beam; and
a light combining element, capable of reflecting the first color light beam and the second color light beam, wherein the third color light beam is capable of passing through the light combining element.

17. The projection apparatus as claimed in claim 16, wherein the light combining element comprises:
a first reflective element, reflecting the first color light beam; and
a second reflective element, wherein the second reflective element and the first reflective element are crossed, the second reflective element reflects the second color light beam, and the third color light beam passes through the first reflective element and the second reflective element.

18. The projection apparatus as claimed in claim 16, wherein the first light source, the second light source, and the third light source are respectively light emitting diodes.

19. A projection apparatus, comprising:
an illumination system, capable of providing an illumination beam;
a light reflective unit, disposed on a transmission path of the illumination beam;
a light valve, disposed on the transmission path of the illumination beam and located between the illumination system and the light reflective unit, wherein the light valve has an active surface and the active surface is capable of converting the illumination beam from the light reflective unit into an image beam; and
a light beam adjusting element, disposed on the transmission path of the illumination beam and located between the illumination system and the light valve, and the light beam adjusting element being capable of reflecting a light from the light valve, wherein the light is not the image beam,
wherein the light beam adjusting element comprises:
at least a lens, having a first optical axis, wherein an included angle between the first optical axis and a normal vector of the active surface is not equal to 90°,
wherein the included angle between the first optical axis and the normal vector of the active surface substantially falls in an angle scope greater than or equal to 70° and less than or equal to 88.5°.

* * * * *